UNITED STATES PATENT OFFICE.

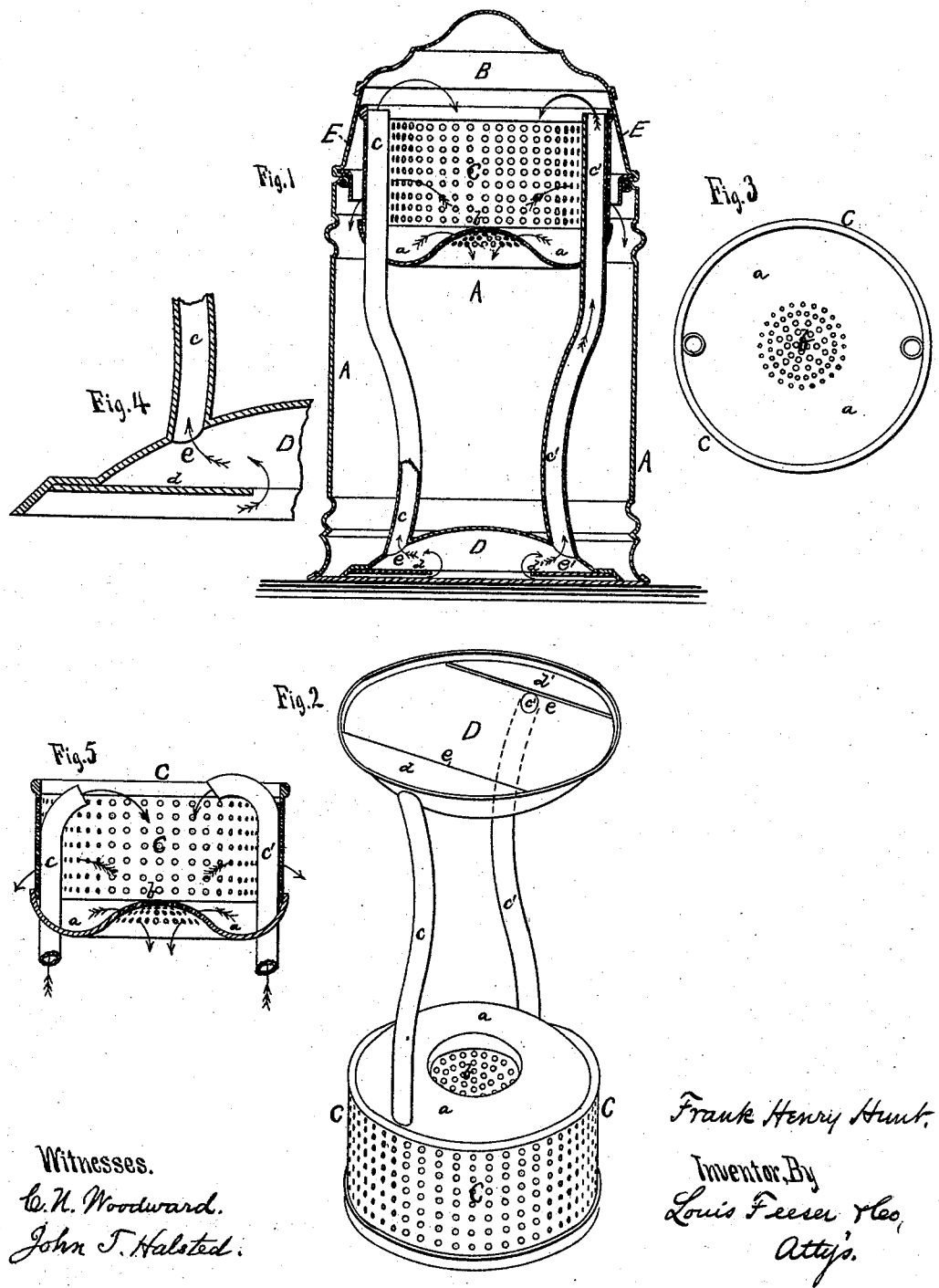

FRANK H. HUNT, OF MINNEAPOLIS, MINNESOTA.

IMPROVEMENT IN COFFEE-POTS.

Specification forming part of Letters Patent No. 203,275, dated May 7, 1878; application filed February 25, 1878.

*To all whom it may concern:*

Be it known that I, FRANK HENRY HUNT, of Minneapolis, in the county of Hennepin and State of Minnesota, have invented certain new and useful Improvements in Coffee-Pots, which improvements are fully set forth in the following specification and accompanying drawings, in which—

Figure 1 is a sectional side elevation. Fig. 2 is a perspective view of the basket, base, and connecting-tubes reversed. Fig. 3 is a plan view of the basket; Figs. 4 and 5, detail views.

This invention relates to that class of coffee-pots known as "fountain coffee-pots;" and consists in forming in the bottom of the perforated basket or receptacle for the coffee an annular cavity or sediment-trap, as hereinafter explained.

The invention further consists in the arrangement in the base, from which the tubes rise, of a series of accelerating-plates, to assist the water in its ascent of the tube, as hereinafter set forth.

A is the outer casing or can; B, the cover; and C, the usual perforated basket, in which the dry coffee is placed.

Great difficulty has been heretofore experienced in preventing the sediment from falling down into the water; but I prevent this by forming a trap, $a$, consisting of an annular cavity, in the bottom of the basket C, leaving a raised perforated portion, $b$, in the center, the trap $a$ being made of solid metal. The sediment and fine coffee are all caught and retained in this trap, and prevented from passing down into the liquor, thus doing away with the necessity of any further straining. This is a very important feature of my invention, and is novel, so far as I am aware.

$c\ c'$ are two or more tubes, which connect the basket C with the hollow base D, and whose upper ends open into the basket near its top. By this means the center of the basket is left unobstructed, so that it may be more readily cleansed, as well as more easily filled or emptied of grounds. But the most important result is found in the fact that a much less quantity of water is necessary to leach the same amount of coffee, as two tubes will carry up just twice as much water as one tube, and will consequently do the work in one-half the time, or in the same time with one-half the quantity of water. Moreover, much less heat is required to force the water up the smaller tubes. These results have actually been obtained by experiment.

In the bottom of the hollow base D, I arrange a series of plates, $d\ d'$, beneath the entrances to the tubes $c$, leaving chambers $e\ e'$, which act as accelerators, to assist the water in its ascent of the tubes, and force a much larger volume through the tubes than when no plates are used, as the plates form a funnel-shaped recess beneath each tube, which confines the water and steam in a smaller compass, and thus causes the expansion of the steam to act much more readily upon the water, and force it up through the tubes much faster.

A less degree of heat is required to produce the same effect than without the plates.

E is an inclined rim, attached to and forming part of the cover B, and which rests against the upper edge of the basket C, and serves to hold it in place in the center of the can A, so that the basket may be made smaller than the can, and still be prevented from tipping sidewise when the coffee is poured out.

I am aware that the perforated basket, hollow base, and tubes are not new; but such I do not claim, broadly, as I am acquainted with the patents of M. J. Stubbing, September 23, 1873, No. 143,102, and R. H. Kuper, April 11, 1871, No. 113,674, which show these features.

Having thus described my invention, what I claim as new, and desire to secure by Letters Patent, is—

1. The combination, with the hollow base D and one or more tubes, $c\ c'$, of the accelerating plate or plates $d\ d'$, in the manner substantially as hereinbefore specified.

2. The combination, with the perforated basket C, of the sediment-trap $a$, arranged in the bottom thereof, substantially as hereinbefore specified.

In testimony whereof I have hereunto set my hand in the presence of two subscribing witnesses.

FRANK HENRY HUNT.

Witnesses:
C. N. WOODWARD,
LOUIS FEESER.